(12) United States Patent
Ma et al.

(10) Patent No.: US 12,197,214 B2
(45) Date of Patent: Jan. 14, 2025

(54) SYSTEM AND METHOD FOR COMPLETING CONTINUAL MULTI-AGENT TRAJECTORY FORECASTING

(71) Applicant: Honda Motor Co., Ltd., Tokyo (JP)

(72) Inventors: Hengbo Ma, Albany, CA (US); Jiachen Li, Albany, CA (US); Chiho Choi, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 529 days.

(21) Appl. No.: 17/380,224

(22) Filed: Jul. 20, 2021

(65) Prior Publication Data

US 2022/0308581 A1    Sep. 29, 2022

Related U.S. Application Data

(60) Provisional application No. 63/164,931, filed on Mar. 23, 2021.

(51) Int. Cl.
   *G05D 1/00*    (2024.01)
   *G01S 17/89*    (2020.01)
   *G08G 1/04*    (2006.01)

(52) U.S. Cl.
   CPC ............ *G05D 1/0088* (2013.01); *G01S 17/89* (2013.01); *G08G 1/04* (2013.01)

(58) Field of Classification Search
   CPC ..... G05D 1/0088; G01S 17/89; G01S 17/931; G08G 1/04; G08G 1/166;
   (Continued)

(56) References Cited

U.S. PATENT DOCUMENTS

2009/0016600 A1 *  1/2009  Eaton ..................... G06V 20/47
2013/0262349 A1 * 10/2013  Bouqata ................. G06N 20/10
(Continued)

FOREIGN PATENT DOCUMENTS

DE    102018213971 A1 *  2/2020

OTHER PUBLICATIONS

Machine Translation of DE-102018213971-A1, Method and Device for Selecting a Driving Maneuver, pp. 1-11 (Year: 2020).*
(Continued)

*Primary Examiner* — Elaine Gort
*Assistant Examiner* — Ellis B. Ramirez
(74) *Attorney, Agent, or Firm* — Rankin, Hill & Clark LLP

(57) ABSTRACT

A system and method for completing continual multi-agent trajectory forecasting with a graph-based conditional generative memory system that include receiving data associated with a surrounding location of an ego agent and inputting the data associated with the surrounding location of the ego agent to at least one episodic memory buffer and processing scene graphs associated with the surrounding location of the ego agent that are associated with the plurality of time steps. The system and method additionally include aggregating the data associated with the surrounding location of the ego agent associated with the plurality of time steps into mixed data and training a generative memory and a predictor with the mixed data. The system and method further include predicting future trajectories associated with traffic agents that are located within the surrounding location of the ego agent based on the training of the generative memory and the predictor.

20 Claims, 5 Drawing Sheets

(58) Field of Classification Search
CPC ........ B60W 60/00276; B60W 2552/53; G06N 3/044; G06N 3/0464; G06N 3/0455; G06N 3/047; G06N 3/049; G06N 3/088; G06N 20/00; G06T 7/70; G06T 2207/30241
USPC ............ 701/23, 27; 706/12, 15, 58; 382/159
See application file for complete search history.

(56) References Cited

U.S. PATENT DOCUMENTS

| | | | | |
|---|---|---|---|---|
| 2014/0129504 | A1* | 5/2014 | Soon-Shiong | G06N 5/022 |
| 2018/0096594 | A1* | 4/2018 | Robinson | G08G 1/042 |
| 2019/0303764 | A1* | 10/2019 | Uria-Martínez | G06N 3/006 |
| 2019/0382007 | A1* | 12/2019 | Casas | G06N 3/045 |
| 2020/0082248 | A1* | 3/2020 | Villegas | G06N 3/044 |
| 2020/0302339 | A1* | 9/2020 | Nadamuni Raghavan | G06F 3/0659 |
| 2020/0310423 | A1* | 10/2020 | Cho | G06N 3/02 |
| 2020/0310449 | A1* | 10/2020 | Nedunuri | G05D 1/0221 |
| 2021/0094587 | A1* | 4/2021 | Pilly | B60W 60/0051 |
| 2021/0148727 | A1* | 5/2021 | Narayanan | G06V 40/20 |
| 2021/0206387 | A1* | 7/2021 | Brahma | B60W 60/001 |

OTHER PUBLICATIONS

T. Adel, H. Zhao, and R. E. Turner, "Continual learning with adaptive weights (claw)," in International Conference on Learning Representations, 2020.
A. Alahi, K. Goel, V. Ramanathan, A. Robicquet, L. Fei-Fei, and S. Savarese, "Social lstm: Human trajectory prediction In crowded spaces," in Proceedings of the IEEE conference on computer vision and pattern recognition, 2016, pp. 961-971.
J. Bock, R. Krajewski, T. Moers, S. Runde, L. Vater, and L. Eckstein, "The ind dataset: A drone dataset of naturalistic road user trajectories at german intersections," in 2020 IEEE Intelligent Vehicles Symposium (IV). IEEE, 2019, pp. 1929-1934.
S. Casas, W. Luo, and R. Urtasun, "Intentnet: Learning to predict intention from raw sensor data," in Conference on Robot Learning, 2018, pp. 947-956.
Y. Chai, B. Sapp, M. Bansal, and D. Anguelov, "Multipath: Multiple probabilistic anchor trajectory hypotheses for behavior prediction," arXiv preprint arXiv:1910.05449, 2019.
M.-F. Chang, J. Lambert, p. Sangkloy, J. Singh, S. Bak, A. Hartnett, D. Wang, P. Carr, S. Lucey, D. Ramanan, et al., "Argoverse: 3d tracking and forecasting with rich maps," in Proceedings of the IEEE Conference on Computer Vision and Pattern Recognition, 2019, pp. 8748-8757.
A. Chaudhry, M. Ranzato, M. Rohrbach, and M. Elhoseiny, "Efficient lifelong learning with a-gem," arXiv preprint arXiv:1812.00420, 2018.
C. Choi and B. Dariush, "Looking to relations for future trajectory forecast," in Proceedings of the IEEE/CVF International Conference on Computer Vision, 2019, pp. 921-930.
N. D Díaz-Rodríguez, V. Lomonaco, D. Filliat, and D. Maltoni, "Don't forget, there is more than forgetting: new metrics for continual learning," arXiv preprint arXiv:1810.13166, 2018.
C. Dong, J. M. Dolan, and B. Litkouhi, "Intention estimation for ramp merging control in autonomous driving," in 2017 EEE Intelligent Vehicles Symposium (IV). IEEE, 2017, pp. 1584-1589.
J. Gao, C. Sun, H. Zhao, Y. Shen, D. Anguelov, C. Li, and C. Schmid, "Vectornet: Encoding hd maps and agent dynamics from vectorized representation," in Proceedings of the IEEE/CVF Conference on Computer Vision and Pattern Recognition, 2020, pp. 11525-11533.
A. Gupta, J. Johnson, L. Fei-Fei, S. Savarese, and A. Alahi, "Social gan: Socially acceptable trajectories with generative adversarial networks," in Proceedings of the IEEE Conference on Computer Vision and Pattern Recognition, 2018, pp. 2255-2264.

G. Habibi, N. Jaipuria, and J. P. How, "Sila: An incremental learning approach for pedestrian trajectory prediction," In Proceedings of the IEEE/CVF Conference on Computer Vision and Pattern Recognition Workshops, pp. 1024-1025, 2020.
J. Hong, B. Sapp, and J. Philbin, "Rules of the road: Predicting driving behavior with a convolutional model of semantic Interactions," in Proceedings of the IEEE Conference on Computer Vision and Pattern Recognition, 2019, pp. 8454-8462.
Y. Hoshen, "Vain: Attentional multi-agent predictive modeling," in Advances in Neural Information Processing Systems, 2017, pp. 2701-2711.
Y. Hu, W. Zhan, and M. Tomizuka, "Scenario-transferable semantic graph reasoning for interaction-aware probabilistic prediction," arXiv preprint arXiv:2004.03053, 2020.
S. C. Y. Hung, C.-H. Tu, C.-E. Wu, C.-H. Chen, Y.-M. Chan, and C.-S. Chen, "Compacting, picking and growing for unforgetting continual learning," in NeurIPS, 2019, pp. 13669-13679.
D. Isele and A. Cosgun, "Selective experience replay for lifelong learning," in Proceedings of the AAAI Conference on Artificial Intelligence, vol. 32, No. 1, 2018.
D. Kasper, G. Weidl, T. Dang, G. Breuel, A. Tamke, A. Wedel, and W. Rosenstiel, "Object-oriented bayesian networks for detection of lane change maneuvers," IEEE Intelligent Transportation Systems Magazine, vol. 4, No. 3, pp. 19-31, 2012.
T. Kipf, E. Fetaya, K.-C. Wang, M. Welling, and R. Zemel, "Neural relational inference for interacting systems," arXiv preprint arXiv:1802.04687, 2018.
N. Lee, W. Choi, P. Vernaza, C. B. Choy, P. H. Torr, and M. Chandraker, "Desire: Distant future prediction in dynamic scenes with interacting agents," in Proceedings of the IEEE Conference on Computer Vision and Pattern Recognition, 2017, pp. 336-345.
J. Li, H. Ma, and M. Tomizuka, "Interaction-aware multi-agent tracking and probabilistic behavior prediction via adversarial learning," in 2019 International Conference on Robotics and Automation (ICRA). IEEE, 2019, pp. 6658-6664.
J. Li, H. Ma, W. Zhan, and M. Tomizuka, "Coordination and trajectory prediction for vehicle interactions via bayesian generative modeling," In 2019 IEEE Intelligent Vehicles Symposium (IV), pp. 2496-2503. IEEE, 2019.
J. Li, F. Yang, M. Tomizuka, and C. Choi, "Evolvegraph: Multi-agent trajectory prediction with dynamic relational reasoning," In Advances in neural information processing systems, 2020.
X. Li, X. Ying, and M. C. Chuah, "Grip: Graph-based interaction-aware trajectory prediction," in 2019 IEEE Intelligent Transportation Systems Conference (ITSC). IEEE, 2019, pp. 3960-3966.
D. Lopez-Paz and M. Ranzato, "Gradient episodic memory for continual learning," in NIPS, 2017.
Y. Ma, X. Zhu, S. Zhang, R. Yang, W. Wang, and D. Manocha, "Trafficpredict: Trajectory prediction for heterogeneous traffic-agents," in Proceedings of the AAAI Conference on Artificial Intelligence, vol. 33, 2019, pp. 6120-6127.
J. Pomponi, S. Scardapane, V. Lomonaco, and A. Uncini, "Efficient continual learning in neural networks with embedding regularization," Neurocomputing, Feb. 2020.
N. Rhinehart, R. McAllister, K. Kitani, and S. Levine, "Precog: Prediction conditioned on goals in visual multi-agent settings," in Proceedings of the IEEE International Conference on Computer Vision, 2019, pp. 2821-2830.
M. Rostami, S. Kolouri, and P. K. Pilly, "Complementary learning for overcoming catastrophic forgetting using experience replay," arXiv, 2019. [Online]. Available: http://arxiv.org/abs/1903.04566.
A. Sadeghian, V. Kosaraju, A. Sadeghian, N. Hirose, H. Rezatofighi, and S. Savarese, "Sophie: An attentive gan for predicting paths compliant to social and physical constraints," 2019, pp. 1349-1358.
T. Salzmann, B. Ivanovic, P. Chakravarty, and M. Pavone, "Trajectron++: Dynamically-feasible trajectory forecasting with heterogeneous data," arXiv preprint arXiv:2001.03093, 2020.
H. Shin, J. K. Lee, J. Kim, and J. Kim, "Continual learning with deep generative replay," in Advances in Neural Information Processing Systems 30, I. Guyon, U. V. Luxburg, S. Bengio, H. Wallach, R. Fergus, S. Vishwanathan, and R. Garnett, Eds. Curran Associates, Inc., 2017, pp. 2990-2999.

(56) References Cited

OTHER PUBLICATIONS

C. Sun, P. Karlsson, J. Wu, J. B. Tenenbaum, and K. Murphy, "Stochastic prediction of multi-agent interactions from partial observations," arXiv preprint arXiv:1902.09641, 2019.

P. Veličković, G. Cucurull, A. Casanova, A. Romero, P. Lio, and Y. Bengio, "Graph attention networks," arXiv preprint arXiv:1710.10903, 2017.

A. Vemula, K. Muelling, and J. Oh, "Social attention: Modeling attention in human crowds," in 2018 IEEE international Conference on Robotics and Automation (ICRA). IEEE, 2018, pp. 1-7.

J. von Oswald, C. Henning, J. Sacramento, and B. F. Grewe, "Continual learning with hypernetworks," in International Conference on Learning Representations, Sep. 2020.

W. Zhan, L. Sun, D. Wang, H. Shi, A. Clausse, M. Naumann, J. Kummerle, H. Königshof, C. Stiller, A. de La Fortelle, and M. Tomizuka, "INTERACTION Dataset: An INTERnational, Adversarial and Cooperative moTION Dataset in Interactive Driving Scenarios with Semantic Maps," arXiv:1910.03088 [cs, eess], 2019.

* cited by examiner

SYSTEM AND METHOD FOR COMPLETING CONTINUAL MULTI-AGENT TRAJECTORY FORECASTING

CROSS-REFERENCE TO RELATED APPLICATION

This application claims priority to U.S. Provisional Application Ser. No. 63/164,931 filed on Mar. 23, 2021, which is expressly incorporated herein by reference.

BACKGROUND

As a prerequisite of decision making, motion planning and control, multi-agent trajectory prediction plays a significant role in autonomous driving systems. Predicting the possible future trajectories of surrounding traffic participants in different scenarios is essential to achieve the efficiency and safety of an autonomous driving system. Several factors, including the various complex road geometry and the multiple traffic agents, give rise to complicated behaviors and increase the difficulty of trajectory prediction.

BRIEF DESCRIPTION

According to one aspect, a computer-implemented method for completing continual multi-agent trajectory forecasting with a graph-based conditional generative memory system that includes receiving data associated with a surrounding location of an ego agent. The data is associated with a plurality of time steps. The computer-implemented method also includes inputting the data associated with the surrounding location of the ego agent to at least one episodic memory buffer and processing scene graphs associated with the surrounding location of the ego agent that are associated with the plurality of time steps. The computer-implemented method additionally includes aggregating the data associated with the surrounding location of the ego agent associated with the plurality of time steps into mixed data and training a generative memory and a predictor with the mixed data. The computer-implemented method further includes predicting future trajectories associated with traffic agents that are located within the surrounding location of the ego agent based on the training of the generative memory and the predictor.

According to another aspect, a system for completing continual multi-agent trajectory forecasting with a graph-based conditional generative memory system that includes a memory storing instructions when executed by a processor cause the processor to receive data associated with a surrounding location of an ego agent. The data is associated with a plurality of time steps. The instructions also cause the processor to input the data associated with the surrounding location of the ego agent to at least one episodic memory buffer and process scene graphs associated with the surrounding location of the ego agent that are associated with the plurality of time steps. The instructions additionally cause the processor to aggregate the data associated with the surrounding location of the ego agent associated with the plurality of time steps into mixed data and train a generative memory and a predictor with the mixed data. The instructions further cause the processor to predict future trajectories associated with traffic agents that are located within the surrounding location of the ego agent based on the training of the generative memory and the predictor.

According to yet another aspect, a non-transitory computer readable storage medium storing instruction that when executed by a computer, which includes a processor perform a method that includes receiving data associated with a surrounding location of an ego agent. The data is associated with a plurality of time steps. The method also includes inputting the data associated with the surrounding location of the ego agent to at least one episodic memory buffer and processing scene graphs associated with the surrounding location of the ego agent that are associated with the plurality of time steps. The method additionally includes aggregating the data associated with the surrounding location of the ego agent associated with the plurality of time steps into mixed data and training a generative memory and a predictor with the mixed data. The method further includes predicting future trajectories associated with traffic agents that are located within the surrounding location of the ego agent based on the training of the generative memory and the predictor.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
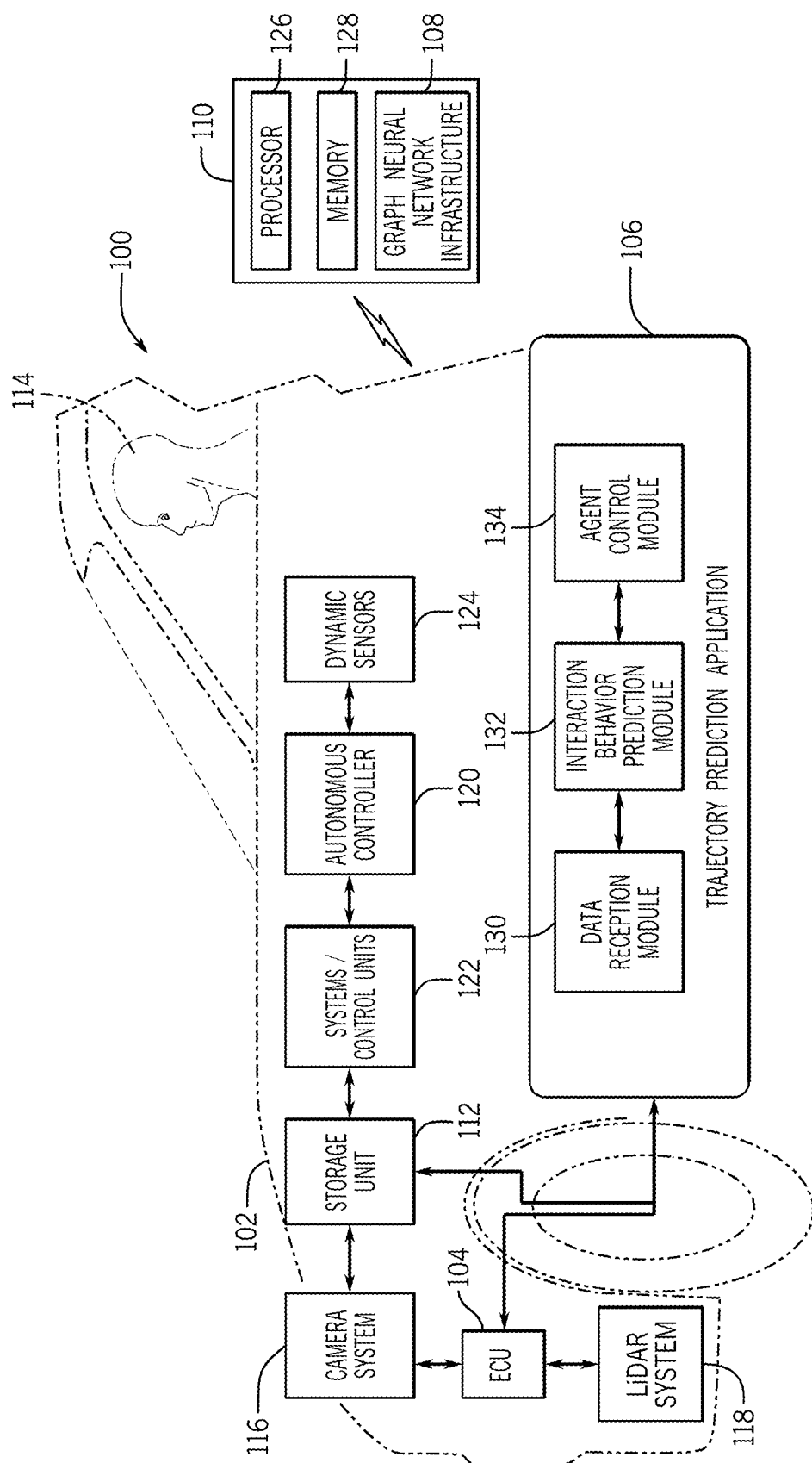
FIG. 1 is a schematic view of an exemplary system for completing continual multi-agent interaction behavior prediction with conditional generative memory according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for completing continual multi-agent interaction behavior prediction with conditional generative memory according to an exemplary embodiment of the present disclosure. The components of the system 100, as well as the components of other systems, hardware architectures, and software architectures discussed herein, may be combined, omitted, or organized into different architectures for various embodiments.

Generally, the system includes an ego agent 102 that includes an electronic control unit (ECU) 104 that executes one or more applications, operating systems, agent system and subsystem user interfaces, among others. The ECU 104 may also execute an interaction trajectory behavior prediction application (trajectory prediction application) 106 that may be configured to complete continual multi-agent interaction behavior prediction with respect to multi-agent trajectories with the utilization of conditional generative memory. The trajectory prediction application 106 may be configured to utilize a graph neural network infrastructure 108 to generate a mixed dataset that is utilized to train both a conditional generative memory and a predictor.

As discussed below, the trajectory prediction application 106 may utilize the graph neural network infrastructure 108 to output predicted trajectories of traffic agents (e.g., pedestrians and vehicles) that may be located within a surrounding location of the ego agent 102 based on historical trajectory data associated with past time steps (e.g., past points in time) and data associated with traffic agents that are located within the surrounding location of the ego agent 102 at a current time step (e.g., at a current point in time). The surrounding location of the ego agent 102 may include a surrounding environment of the ego agent 102. Accordingly, the surrounding location may include respective roadways, pathways, taxiways, hallways, and the like that may be included within the surrounding environment of the ego agent 102.

The ego agent 102 may include, but may not be limited to, a vehicle, a robot, a motorized bicycle/scooter, an automated shopping cart, an automated carrier/carriage/suit case, a motorized wheel chair, and the like. The trajectory prediction application 106 may be configured to receive data associated with one or more locations of the ego agent 102. As discussed in more detail below, such data may be analyzed by the trajectory prediction application 106 to train a generative memory of the graph neural network infrastructure 108. The generative memory may be utilized to train a predictor of the graph neural network infrastructure 108 to complete trajectory prediction for each of the traffic agents that are located within the surrounding location of the ego agent 102.

The trajectory prediction application 106 may be configured to provide a multi-agent interaction behavior prediction in a continual learning setting, where various datasets may be collected at various locations. In many scenarios, catastrophic forgetting may occur with respect to prediction methods. Intuitively, since interaction behaviors at a current time step at the surrounding location of the ego agent 102 may differ from interaction behaviors that occur at one or more past time steps at the surrounding location of the ego agent 102 due to different locations of traffic participants within the surrounding location of the ego agent 102 at different points in time, models may prefer to utilize more current interaction behaviors associated with the surrounding location over interaction behaviors associated with the older past locations as models. In other words, prediction models may more likely be trained on more recent location information rather than past location information which results in the phenomenon known as catastrophic forgetting.

This phenomenon of catastrophic forgetting may result in the underutilization of what is learned before and an inefficient and/or ineffective performance of such models on a surrounding location of the ego agent 102 that may be different than the previous locations. The trajectory prediction application 106 provides an improvement in a computer and the technology surrounding trajectory prediction such that it mitigates catastrophic forgetting and provides multi-agent interaction behavior prediction using a graph neural network based continual multi-agent trajectory prediction framework at numerous locations with numerous environments and roadway configurations captured at various points in time. Accordingly, the application 106 enables continual learning to be effectively used in multi-agent trajectory prediction tasks.

As discussed in more detail below (and represented in FIG. 3), the trajectory prediction application 106 utilizes the graph neural network infrastructure 108 which includes the predictor, an episodic memory buffer, and a conditional variational auto-encoder as part of generative memory. The trajectory prediction application 106 may be configured to receive input data in the form of sensor data and may process different datasets that are based on different locations that include various surrounding environments of the ego agent 102 at various points in time. The trajectory prediction application 106 utilizes episodic memory which stores initial graph information that is associated one or more past time steps.

The trajectory prediction application 106 may be configured to sample a batch of initial graphs and use conditional generative memory to generate past trajectories that are associated with traffic agents that may be located within the surrounding location of the ego agent 102 at one or more respective past time steps. The trajectory prediction application 106 may thereby be configured to utilize mixed data that is a mixture of data associated with the past time steps and current data that is associated with the current time step with respect to the surrounding location of the ego agent 102.

The mixed data may be utilized to train a generative memory which may be further utilized to train a predictor to thereby output predicted trajectories that may be associated with each of the traffic agents that are located within the surrounding location of the ego agent 102. A small portion of the current dataset may also be sampled to be stored in the episodic memory buffer to be utilized at future time steps (e.g., at time steps that are in a future point in time from the current time step). Accordingly, the trajectory prediction application 106 enables continual learning to be used in multi-agent trajectory prediction tasks.

As discussed below, the trajectory prediction application 106 may be configured to provide commands to control one or more systems of the ego agent 102. Such commands may include alert control commands and/or autonomous control commands that may be utilized to provide one or more alerts (e.g., trajectory-based warnings) and/or agent autonomous controls that may be associated with the ego agent 102.

With continued reference to FIG. 1, the ECU 104 may be configured to be operably connected to a plurality of additional components of the ego agent 102, including, but not limited to, a storage unit 112, a camera system 116, a LiDAR system 118, an autonomous controller 120, systems/control units 122, and dynamic sensors 124. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego agent 102.

The ECU 104 may also include a communication device (not shown) for sending data internally within (e.g., between one or more components) the ego agent 102 and communicating with externally hosted computing systems (e.g., external to the ego agent 102). Generally, the ECU 104 may communicate with the storage unit 112 to execute the one or more applications, operating systems, system and subsystem user interfaces, and the like that are stored within the storage unit 112.

In one embodiment, the ECU 104 may communicate with the autonomous controller 120 to execute autonomous driving commands to operate the ego agent 102 to be fully autonomously driven or semi-autonomously driven in a particular manner. As discussed below, the autonomous driving commands may be based on commands provided by the trajectory prediction application 106 to navigate the ego agent 102 within its surrounding location to autonomously control one or more functions of the ego agent 102 to account for the predicted trajectories of one or more of the traffic agents that are located within the surrounding location of the ego agent 102.

In particular, the autonomous driving commands may be based on commands provided by the trajectory prediction application 106 to autonomously control one or more functions of the ego agent 102 to travel within the surrounding location while avoiding any overlap at concurrent time steps with respect to the predicted trajectories of one or more of the traffic agents that are located within the surrounding location of the ego agent 102.

In one or more embodiments, the autonomous controller 120 may autonomously control the operation of the ego agent 102 by providing one or more commands to one or more of the systems/control units 122 to provide full autonomous or semi-autonomous control of the ego agent 102 to follow agent autonomous commands provided by the application 106. Such autonomous control of the ego agent 102 may be provided by sending one or more commands to control one or more of the systems/control units 122 to operate (e.g., drive, navigate) the ego agent 102 during one or more circumstances (e.g., when providing driver assist controls), and/or to fully control operation of the ego agent 102.

In some embodiments, one or more commands may be provided to control one or more advanced driver assist systems (ADAS) (not shown) of the ego agent 102 that may be manually driven by an operator 114 (e.g., driver) to provide one or more alerts and/or warnings account for the predicted trajectories of one or more of the traffic agents that are located within the surrounding location of the ego agent 102.

The one or more commands may be provided to one or more systems/control units 122 that include, but are not limited to an engine control unit, a braking control unit, a transmission control unit, a steering control unit, and the like to control the ego agent 102 to be autonomously driven based on one or more autonomous commands that are output by the trajectory prediction application 106 to navigate the ego agent 102 within the surrounding location of the ego agent 102. In particular, one or more functions of the ego agent 102 may be autonomously controlled to travel within the surrounding environment while avoiding any overlap at concurrent time steps with respect to the predicted trajectories of one or more of the traffic agents that are located within the surrounding location of the ego agent 102.

In one or more embodiments, the systems/control units 122 may be operably connected to the dynamic sensors 124 of the ego agent 102. The dynamic sensors 124 may be configured to receive inputs from one or more systems, sub-systems, control systems, and the like. In one embodiment, the dynamic sensors 124 may be included as part of a Controller Area Network (CAN) of the ego agent 102 and may be configured to provide dynamic data to the ECU 104 to be utilized for one or more systems, sub-systems, control systems, and the like. The dynamic sensors 124 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one configuration, the dynamic sensors 124 may provide dynamic data in the form of one or more values (e.g., numeric levels) that are associated with the real-time dynamic performance of the ego agent 102 as one or more driving maneuvers are conducted and/or as the ego agent 102 is controlled to be autonomously driven. As discussed below, dynamic data that is output by the dynamic sensors 124 may be associated with a real time dynamic operation of the ego agent 102 as it is traveling within the surrounding environment. The dynamic data may be analyzed by the trajectory prediction application 106 to determine dynamic constraints associated with the ego agent 102 to thereby autonomously control the ego agent 102 to operate based on such constraints in a manner that avoids any overlap with the predicted trajectories of one or more traffic agents that are located within the surrounding location of the ego agent 102.

With continued reference to FIG. 1, the camera system 116 may include one or more of the cameras (not shown) that may be positioned in one or more directions and at one or more areas to capture one or more images of the surrounding environment of the ego agent 102 (e.g., images of the roadway on which the ego agent 102 is traveling). The one or more cameras of the camera system 116 may be disposed at external front portions of the ego agent 102, including, but not limited to different portions of a dashboard, a bumper, front lighting units, fenders, and a windshield. In one embodiment, the one or more cameras may be configured as RGB cameras that may capture RGB bands that are configured to capture rich information about object appearance that pertain to roadway lane markings, roadway/pathway markers, and/or roadway/pathway infrastructure (e.g., guardrails).

In other embodiments, the one or more cameras may be configured as stereoscopic cameras that are configured to capture environmental information in the form of three-dimensional images. In one or more configurations, the one or more cameras may be configured to capture one or more first person viewpoint RGB images/videos of the surrounding location of the ego agent 102 from the perspective of the ego agent 102. In one embodiment, the camera system 116 may be configured to convert one or more RGB images/videos (e.g., sequences of images) into image data that is communicated to the trajectory prediction application 106 to be analyzed.

In an exemplary embodiment, the LiDAR system 118 may be operably connected to a plurality of LiDAR sensors (not shown). In particular, the LiDAR system 118 may include one or more planar sweep lasers that include respective three-dimensional LiDAR sensors that may be configured to oscillate and emit one or more laser beams of ultraviolet, visible, or near infrared light toward the surrounding environment of the ego agent 102. The plurality of LiDAR sensors may be configured to receive one or more reflected laser waves (e.g., signals) that are reflected off one or more traffic agents that are located within the surrounding location of the ego agent 102. In other words, upon transmitting the one or more laser beams to the surrounding environment, the one or more laser beams may be reflected as laser waves by one or more traffic agents that may be located within the surrounding location of the ego agent 102 at one or more points in time.

In one embodiment, each of the plurality of LiDAR sensors may be configured to analyze the reflected laser waves and output respective LiDAR data to the trajectory prediction application 106. The LiDAR data may include LiDAR coordinates that may be associated with the locations, positions, depths, and/or dimensions (e.g., measurements) of one or more traffic agents such as the surrounding vehicles and pedestrians within locations of the ego agent at various time steps (e.g., that may be located within the surrounding location of the ego agent 102).

As discussed below, image data provided by the camera system 116 and/or the LiDAR data provided by the LiDAR system 118 may be communicated to the trajectory prediction application 106 to be inputted to the graph neural network infrastructure 108 to be electronically analyzed using machine learning/deep learning techniques. As such, the image data provided by the camera system 116 and/or the LiDAR data provided by the LiDAR system 118 may be aggregated and analyzed to determine information associated with multiple agents and their interactions amongst one another and with respect to the ego agent 102.

In an exemplary embodiment, the external server 110 may be owned, operated, and/or managed by an OEM, a third-party administrator, and/or a dataset manager that manages data that is associated with the operation of the trajectory prediction application 106. The external server 110 may be operably controlled by a processor 126 that may be configured to execute the trajectory prediction application 106. In particular, the processor 126 may be configured to execute one or more applications, operating systems, database, and the like. The processor 126 may also include internal processing memory, an interface circuit, and bus lines for transferring data, sending commands, and communicating with the plurality of components of the external server 110.

In one embodiment, the processor 126 may be operably connected to a memory 128 of the external server 110. Generally, the processor 126 may communicate with the memory 128 to execute the one or more applications, operating systems, and the like that are stored within the memory 128. In one embodiment, the memory 128 may store one or more executable application files that are associated with the trajectory prediction application 106.

In one embodiment, the memory 128 of the external server 110 may be configured to store the graph neural network infrastructure 108. As discussed in more detail below, the graph neural network infrastructure 108 may be configured to execute machine learning/deep learning techniques to process graphs that are associated with past trajectories of traffic agents that have been previously located within the surrounding location of the ego agent 102 at past time steps and graphs that are associated with the current trajectories of the traffic agents that are located within the surrounding location of the ego agent 102 at a current time step to be utilized by generative memory and a predictor. The graph neural network infrastructure 108 may be configured in a double memory configuration that may generate interaction behaviors compared with ground truth data.

As a multi-agent interaction behavior predictor may be updated on the generated data and the current data that is associated with the surrounding location of the ego agent 102, the graph neural network infrastructure 108 may be configured to output graphs, and provide node-level, edge-level, and graph-level prediction tasks that are associated with trajectories of traffic agents that are located within the surrounding location of the ego agent 102, thereby mitigating any catastrophic forgetting issues that are found in other complicated multi-agent spatial-temporal prediction techniques.

By utilizing the graph neural network infrastructure 108, the trajectory prediction application 106 provides trajectory prediction and control of one or more agent functions to account for trajectory prediction based on a memory-based approach that is based on graph representation and conditional generative models with superior memory efficiency. Accordingly, based on the functionality of the trajectory prediction application 106 through the utilization of the graph neural network infrastructure 108, continual learning is effectively used in multi-agent trajectory prediction tasks.

II. The Interaction Trajectory Behavior Prediction Application and Related Methods Components of the trajectory prediction application 106 will now be described according to an exemplary embodiment and with continued reference to FIG. 1. In an exemplary embodiment, the trajectory prediction application 106 may be stored on the storage unit 112 and executed by the ECU 104 of the ego agent 102. In another embodiment, the trajectory prediction application 106 may be stored on the memory 128 of the external server 110 and may be accessed by a telematics control unit of the ego agent 102 to be executed by the ECU 104 of the ego agent 102.

The general functionality of the trajectory prediction application 106 will now be discussed. In an exemplary embodiment, the trajectory prediction application 106 may include a plurality of modules 130-134 that may be configured to provide driver situation awareness prediction using human visual sensory and memory mechanism. The plurality of modules 130-134 may include a data reception module 130, an interaction behavior prediction module (interaction prediction module) 132, and an agent control module 134. However, it is appreciated that the trajectory prediction application 106 may include one or more additional modules and/or sub-modules that are included in lieu of the modules 130-134.

Figure 2:
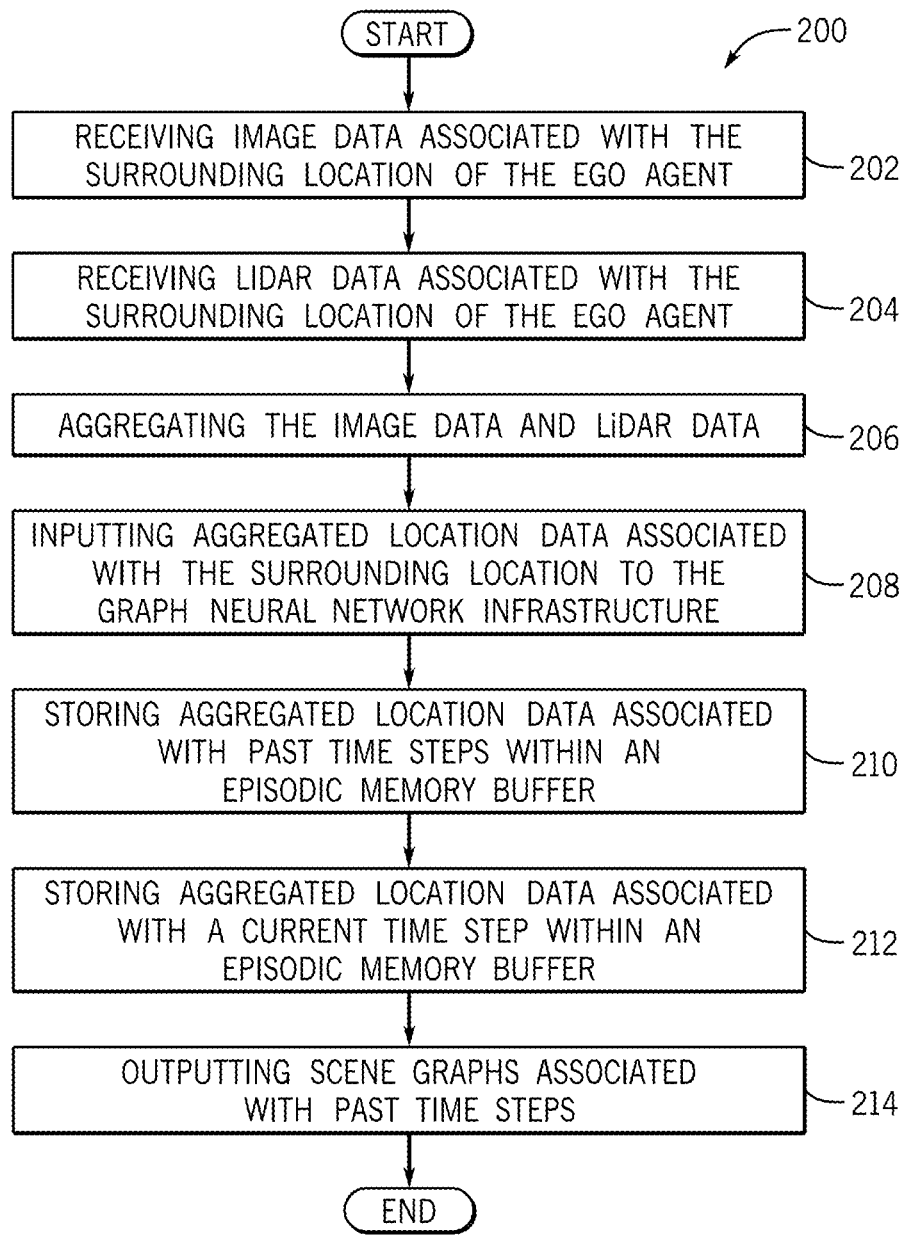
FIG. 2 is a process flow diagram of a method for outputting scene graphs associated with surrounding locations at a plurality of time steps according to an exemplary embodiment of the present disclosure.

FIG. 2 is a process flow diagram of a method 200 for outputting scene graphs associated with the surrounding location of the ego agent 102 according to an exemplary embodiment of the present disclosure. FIG. 2 will be described with reference to the components of FIG. 1 and FIG. 3 though it is to be appreciated that the method 200 of FIG. 2 may be used with other systems/components. It is appreciated that the method 200 may be executed at a current time step t, at one or more past time steps t−n, and/or may be executed at one or more future time steps t+n.

The method 200 may begin at block 202, wherein the method 200 may include receiving image data associated with the surrounding location of the ego agent 102. In an exemplary embodiment, at one or more past time steps and/or at a current time step, the data reception module 130 of the trajectory prediction application 106 may be configured to communicate with the camera system 116 to collect image data associated with untrimmed images/video of the surrounding location of the ego agent 102.

In some configurations, the image data may pertain to one or more first person viewpoint RGB images/videos of the surrounding location of the ego agent 102 captured at particular time steps. The image data may be configured to include rich information about object appearance that pertain to roadway lane markings, roadway/pathway markers, roadway/pathway infrastructure within the surrounding location of the ego agent 102 at one or more time steps. In some embodiments, the data reception module 130 may package and store the image data on the storage unit 112 to be evaluated at one or more points in time.

The method 200 may proceed to block 204, wherein the method 200 may include receiving LiDAR data associated with the surrounding location of the ego agent 102. In an exemplary embodiment, the data reception module 130 may communicate with the LiDAR system 118 of the ego agent 102 to collect LiDAR data that includes LiDAR based observations from the ego agent 102. The LiDAR based observations may indicate the location, range, and positions of the one or more traffic agents off which the reflected laser waves were reflected with respect to a location/position of the ego agent 102. In some embodiments, the data reception module 130 may package and store the LiDAR data on the storage unit 112 to be evaluated at one or more points in time.

The method 200 may proceed to block 206, wherein the method 200 may include aggregating the image data and LiDAR data. In an exemplary embodiment, the data reception module 130 may be configured to aggregate the image data that may include rich information about object appearance that pertain to roadway lane markings, roadway/pathway markers, and/or roadway/pathway infrastructure within the locations of the ego agent 102 at one or more time steps with the LiDAR data that pertains to LiDAR based observations may indicate the location, range, and positions of the one or more traffic agents into aggregated location data that is associated with the surrounding location of the ego agent 102 at respective time steps. In one embodiment, at one or more past time steps and at a current time step, the data reception module 130 may be configured to communicate the aggregated location data to the interaction prediction module 132 of the trajectory prediction application 106.

The method 200 may proceed to block 208, wherein the method 200 may include inputting aggregated location data associated with the surrounding location to the graph neural network infrastructure 108. In an exemplary embodiment, at one or more past time steps and at a current time step, the interaction prediction module 132 may be configured to access the external server 110 and may be configured to communicate aggregated location data associated with data associated with the surrounding location of the ego agent 102 received at one or more respective past time steps to the graph neural network infrastructure 108. With respect to data pertaining to the current environment of the ego agent 102 the interaction prediction module 132 may be configured to communicate the aggregated location data associated with the surrounding location of the ego agent 102 received at the current time step to the graph neural network infrastructure 108.

Figure 3:
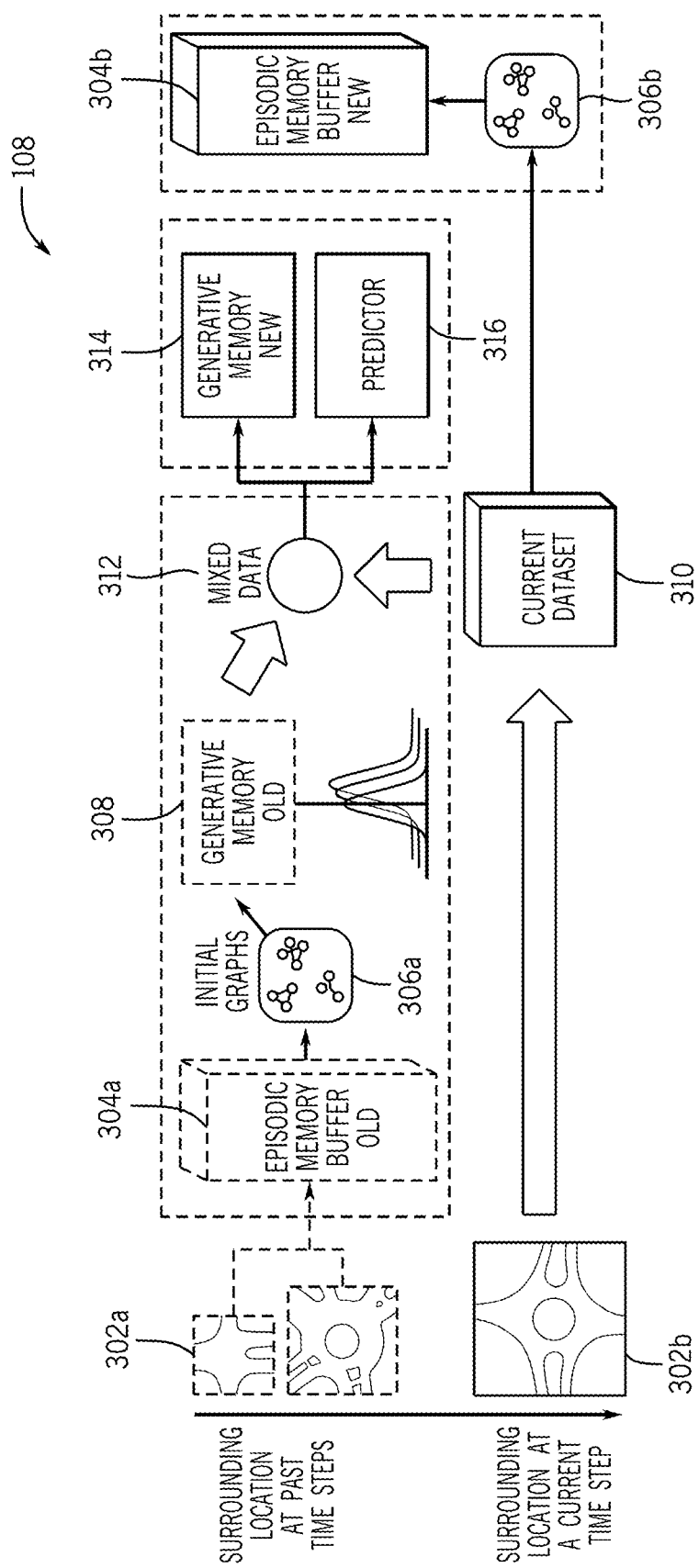
FIG. 3 is a schematic overview of a plurality of components and modules of the graph neural network infrastructure that are utilized to train generative memory and a predictor of the graph neural network infrastructure according to an exemplary embodiment of the present disclosure.

FIG. 3 is a schematic overview of a plurality of components and modules of the graph neural network infrastructure 108 that are utilized to train generative memory 308, 314 and a predictor 316 of the graph neural network infrastructure 108 according to an exemplary embodiment of the present disclosure. As represented in FIG. 3, the aggregated location data 302a associated with past timesteps that include data associated traffic agents that have been located within the surrounding location of the ego agent 102 at one or more past time steps may be inputted to the graph neural network infrastructure 108. Additionally, the aggregated location data 302b associated with the surrounding location of the ego agent 102 that includes data associated with the roadways of the surrounding location and traffic agents that are located within the surrounding location of the ego agent 102 at the current time step may be inputted to the graph neural network infrastructure 108.

Referring again to the method 200 of FIG. 2, upon inputting aggregated location data to the graph neural network infrastructure 108, the method 200 may proceed to block 210, wherein the method 200 may include storing aggregated location data associated with past time steps within an episodic memory buffer 304a. The episodic memory buffer 304a may be configured as an "old" buffer that is configured to store past data or "old data" associated with the position, location, and/or configuration of traffic participants that are located within the surrounding location of the ego agent 102 at past time steps. In an exemplary embodiment, the interaction prediction module 132 may utilize the graph neural network infrastructure 108 to access the episodic memory buffer 304a and store a portion of aggregated location data associated with the past time steps that pertain to position, location, and/or configuration of traffic participants that are located within the surrounding location at the respective past time steps.

In one embodiment, the episodic memory buffer 304a may include memory that is configured to store data pertaining to the past multi-agent interaction trajectories. In one configuration, the graph neural network infrastructure 108 may be configured to reduce an amount of storage of full-length trajectory data that are associated with full-length trajectories that include positions of each of the traffic agents from start to finish of the trajectories at numerous time steps. The graph neural network infrastructure 108 may selectively store some initial information that is associated with the (past) trajectories of each of the traffic agents at respective past time steps. Stated differently, the episodic memory buffer 304a is controlled to be a certain size (e.g., a smaller memory buffer) to store portions of information that pertain to the past trajectories of each of the traffic agents at respective past time steps. In many circumstances, the reduction in the amount of data that is required to be stored may be significant in cases when lengths of certain past trajectories are particularly long.

With continued reference to FIG. 2 and FIG. 3, the method 200 may proceed to block 212, wherein the method 200 may include storing aggregated location data associated with a current time step within an episodic memory buffer 304b. In an exemplary embodiment, upon inputting aggregated location data 302b associated with the surrounding location of the ego agent 102, the aggregated location data 302b may be stored within the memory 128 of the external server 110 as a current dataset 310. The current dataset 310 may be denoted as $\mathcal{D}^k$.

In one configuration, the aggregated location data 302b may be stored within the episodic memory buffer 304b. The episodic memory buffer 304b may be configured as an "new" buffer that is configured to store current data (received in real-time) or "new data" associated with the position, location, and/or configuration of traffic participants that are located within the surrounding location at a current time step. Additionally, the interaction prediction module 132 may be configured to utilize the graph neural network infrastructure 108 to process a scene graph 306b associated with the trajectories of the traffic agents within the surrounding location of the ego agent 102 at the current time step based on current dataset 310 stored upon the memory 128 of the external server 110.

In an exemplary embodiment, the interaction prediction module 132 may utilize the graph neural network infrastructure 108 to access the episodic memory buffer 304b and store a portion of aggregated location data associated with the surrounding location of the ego agent 102 at the current time step. In particular, a small portion of a whole number of cases may be randomly sampled into the current dataset 310 and their data may be represented as a subset of cases in the scene graph 306b that is inputted to the episodic memory buffer 304b.

The utilization of the episodic memory buffer 304b to store small portion of the current dataset 310 may be utilized at future time steps to allow the current dataset 310 that is associated with the surrounding location to be evaluated at one or more future points in time. Accordingly, the trajectory prediction application 106 enables continual learning to be used in multi-agent trajectory prediction tasks for past time steps and the current time step at future points in time. In other words, the trajectory prediction application 106 may continually utilize the graph neural network infrastructure 108 in numerous future iterations using the aggregated location data 302b associated with the surrounding location of the ego agent 102.

Upon storing aggregated location data 302b upon the episodic memory buffer 304, the method 200 may proceed to block 214, wherein the method 200 may include outputting scene graphs 306a associated with past time steps. In one embodiment, the interaction prediction module 132 may be configured to utilize the graph neural network infrastructure 108 to process scene graphs 306a associated with the trajectories of the traffic agents located within the surrounding location of the ego agent 102 at respective past time steps based on data stored upon the episodic memory buffer 304a.

In one configuration, each of the respective scene graphs 306a may be classified as initial graphs that each include initial information that is associated with the selectively stored partial initial information that is associated with the (past) trajectories of each of the traffic agents at respective past time steps. Such initial information for each scene graph 306a may be defined as $\mathcal{G}_{init} = \{\mathcal{V}, \varepsilon\}$, where $\mathcal{V} = \{X_0, X_{-t_h+1}{}^i, X_{t_f}{}^i, I^i\}$ and the edge attribute $E^{ij} \in \varepsilon$ denotes whether there is an edge between node i and j.

There is no edge between two traffic agents if their references do not have any intersection or a particular traffic agent on one reference cannot shift to the other reference by traffic rules. Also, $X_0$ is the current state of each traffic agent at a current time step, $X_{-t_h+1}{}^i$ is the state at H time steps before the current time step, and $X_{t_f}{}^i$ is a goal position that may be defined as an intended destination or location of each traffic agent at one or more future (next) time steps (from the particular past time step captured within the data). Accordingly, the scene graphs 306 may be used to generate the interaction behaviors between the traffic agents located within the surrounding location of the ego agent 102 at respective past time steps that are conditioned on this initial information.

Figure 4:
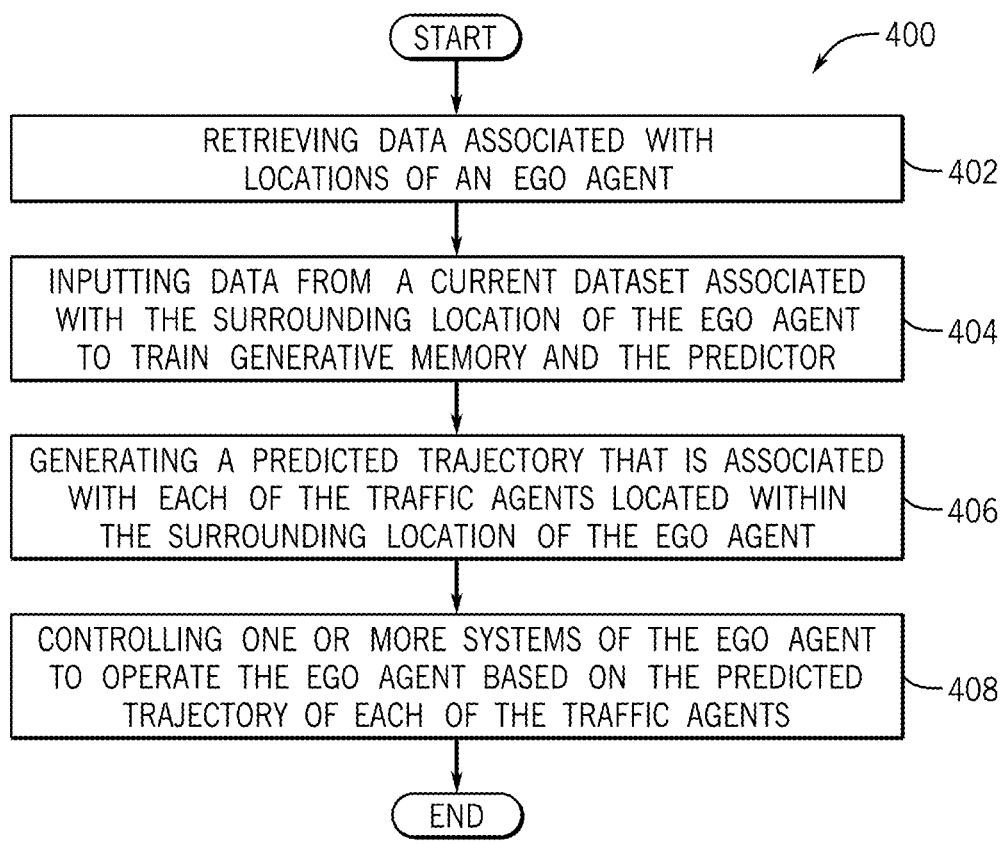
FIG. 4 is a process flow diagram of a method for training the predictor and operating the ego agent based on the predicted trajectories output by the predictor according to an exemplary embodiment of the present disclosure.

FIG. 4 is a process flow diagram of a method 400 for training the predictor 316 and operating the ego agent 102 based on the predicted trajectories output by the predictor 316 according to an exemplary embodiment of the present disclosure. FIG. 4 will be described with reference to the components of FIG. 1 and FIG. 3 though it is to be appreciated that the method 400 of FIG. 4 may be used with other systems/components. It is appreciated that the method 400 may be executed at a current time step t, at one or more past time steps t−n, and/or may be executed at one or more future time steps t+n.

The method 400 may begin at block 402, wherein the method 400 may include retrieving data associated with locations of an ego agent 102. In an exemplary embodiment, the aggregated location data stored upon the episodic memory buffer 304a, 304b may be accessed and retrieved by the data reception module 130 of the trajectory prediction application 106.

With reference to FIG. 3 and FIG. 4, the method 400 may proceed to block 404, wherein the method 400 may include inputting data from a current dataset 310 associated with the surrounding location of the ego agent 102 to train generative memory 314 and the predictor 316. As discussed above, the generated data may be denoted as $D^k$ and the current dataset 310 may be denoted as $\mathcal{D}^k$. Accordingly, the mixed data 312 may be denoted as $\tilde{\mathcal{D}}^k$. In one embodiment, the generative memory 308 of the graph neural network infrastructure 108 may be trained based on the current dataset 310 to thereby train the predictor 316. In one configuration, the generative memory 308 of the graph neural network infrastructure 108 may be configured as an encoder decoder structure that includes convolution neural networks, a respective multiple-layer perceptron that may include input layers, hidden layers and output layers, and recurrent neural networks where connections between nodes may form a directed graph along a temporal sequence.

The generative memory 308 may be configured as conditional generative memory that is P $(X_{-t_h+1:t_f} | \mathcal{G}_{init})$, where $X_{-t_h+1:t_f}$ is the whole trajectories of all traffic agents. With respect to the encoder structure of the generative memory 308, for each traffic agent i, each reference image I' and each trajectory $X_{-t_h+1:t_f}{}^i$ are encoded by a convolutional neural network and a recurrent neural network, respectively. The image I'' is a rasterized reference image of each traffic agent i in an original cartesian coordinate system. The initial state information $\{X_0, X_{-t_h+1}{}^i, X_{t_f}{}^i\}$ are encoded by a multiple-layer perceptron. Upon obtaining three features, the multiple-layer perceptron is used to integrate them. The graph neural network infrastructure 108 may be configured to thereby approximate a posterior distribution $Q(z | X_{-t_h+1:t_f}, \mathcal{G}_{init})$, where $z = \{z^i\}_{i=1:n}$, and $z^i$ is a Gaussian random variable.

With respect to the decoder structure of the generative memory 308, similar to the encoder structure, a multiple-layer perceptron and a convolutional neural network are used to process the initial state information and the reference image I' for each node. The graph neural network infrastructure 108 captures the interaction pattern and uses a recurrent neural network to approximate the full-length trajectory distribution $P(X | z, \mathcal{G}_{init})$, where X is used as the abbreviation of $X_{-t_h+1:t_f}$. The training loss of the conditional VAE $\mathcal{L} G(\theta, \varphi; \tilde{\mathcal{D}})$ is:

$$E_{(X,\mathcal{G}_{init}) \sim D} E_{Q_\varphi(z|X,\mathcal{G}_{init})} [\log [\log P\theta(X|z, \mathcal{G}_{init})] - \text{Reject}$$

$$E_{(X,\mathcal{G}_{init}) \sim D} \mathcal{KL}[Q_\varphi(z|X,\mathcal{G}_{init}) \| P(z)],$$

where $\varphi$ and $\theta$ are the parameters of the encoder $Q\varphi (z|X, \mathcal{G}_{init})$ and the decoder $P\theta (X|z, \mathcal{G}_{init})$. $\beta$ is a hyperparameter to adjust the importance of the second regularization. Upon inputting the initial scene graphs 306a, r trajectories may be sampled from the decoder $\theta (X|z, \mathcal{G}_{init})$ by sampling r times of different z from normal Gaussian distribution. Similar to the predictor, the waypoints of reference $c^i$ to transform $X^i$ to $p^i$ may be used.

Accordingly, a training dataset $\mathcal{D}^k$ at the k-th scenarios may be constructed based on the sampling of $\mathcal{D}^k|r$ initial scene graphs 306a $\mathcal{G}_{init}$ from the episodic memory buffer 304a $\mathcal{B}^{k-1}$. For each initial graph $\mathcal{G}_{init}$, r times of z are randomly sampled for each node in the scene graph 206a and the decoder structure of the generative memory 308 is used to generate r multi-agent trajectories. Accordingly, full multi-agent trajectories of each of the traffic agents at respective past time steps are generated based on the selectively stored partial initial information that is associated with the (past) trajectories of each of the traffic agents located within the surrounding location of the ego agent 102 as respective past time steps initially stored upon the episodic memory buffer 304a. The generated data may be denoted as $D^k$.

In one embodiment, the new generative memory 314 may be configured as new generative memory 314 that is P $(X_{-t_h+1:t_f} | \mathcal{G}_{init})$, where $X_{-t_h+1:t_f}$ is the whole trajectories of all traffic agents located within the surrounding location of the ego agent 102 at past time steps and the surrounding location of the ego agent 102 at a current time step. With respect to the encoder structure of the generative memory 308, for each traffic agent i, each reference image I' and each trajectory $X_{-t_h+1:t_f}{}^i$ are encoded by a convolutional neural network and a recurrent neural network, respectively. The image I' is a rasterized reference image of each traffic agent i in an original cartesian coordinate system. The initial state information $\{X_0, X_{-t_h+1}{}^i, X_{t_f}{}^i\}$ are encoded by a multiple-layer perceptron. Upon obtaining three features, the multiple-layer perceptron is used to integrate them. The graph neural network infrastructure 108 may be configured to approximate a posterior distribution Q $(z|X_{-t_h+1:t_f}, \mathcal{G}_{init})$, where $z=\{z^i\}_{i=1:n}$, and $z^i$ is a Gaussian random variable.

The graph neural network infrastructure 108 may be configured to utilize a decoder to capture an interaction pattern and uses a recurrent neural network to approximate the full-length trajectory distribution $P(X|z, \mathcal{G}_{init})$ for each of the traffic agents. Accordingly, full multi-agent trajectories of each of the traffic agents at past time steps and at the current time step are generated based on the selectively stored partial information that is associated with the (past) trajectories of each of the traffic agents located within the surrounding location of the ego agent 102. In one embodiment, the generative memory 308 may thereby train the predictor 316 to generate a predicted trajectory.

The method 400 may proceed to block 406, wherein the method 400 may include generating a predicted trajectory that is associated with each of the traffic agents located within the surrounding location of the ego agent 102. In an exemplary embodiment, the interaction prediction module 132 may be configured to input the mixed data $\tilde{\mathcal{D}}^k$ to the predictor 316 of the graph neural network infrastructure 108.

In one or more embodiments, the predictor 316 of the graph neural network infrastructure 108 is configured to compute a multi-modal probabilistic multi-agent trajectory distribution using the observation o of all of the traffic agents that have been located at the surrounding location of the ego agent 102 at respective past time steps and that are located within the surrounding location of the ego agent 102 at the current time step. Given a reference $c^i$ of each traffic agent i from $o^i$, the trajectory $p^i$ of each traffic agent i if transformed into the Frenét coordinates and denoted as $X^i$. $I^i$ is defined as the rasterized image of $c^i$ and the notation $c^i$ is reused as waypoints representation of the references.

Velocity information Reject$^i=\{\dot{d}_{lon}{}^i, \dot{d}_{lat}{}^i\}$ associated with each traffic agent i is utilized where $\dot{d}_{lon}{}^i$ and $\dot{d}_{lat}{}^i$ represent the longitudinal velocity and lateral velocity with respect to the reference ego agent 102 $c^i$. For each edge $e_{ij}$ the edge feature is defined as the relative information Reject$^{ij}=\|p^i-p^j\|$, (i.e., the Euclidean distance between different traffic agents). The reference image $I^i$ which is centered at the current position of each traffic agent i is used to provide the future lane geometry information and the surrounding location related to the reference. The y-axis of image $I^i$ aligns to the velocity direction of each traffic agent i. A feature embedding function is used to extract the aforementioned information to form initial node attributes $v_i^0$ and edge attributes $e_{ij}^0$. Given a set of trajectory observations, the graph neural network infrastructure 108 has: $v_i^0$=MLP $((CNN(I^i)\|RNN(Reject^i))e_{ij}^0$=RNN (Reject$^{ij}$).

Accordingly, the predictor 316 and new generative memory 314 are optimized separately: $ⱴ^k$=min Reject$\mathcal{L}_P$ ($ⱴ;\mathcal{D}^k$)+(1-Reject)$\mathcal{L}_P$ ($ⱴ;\tilde{\mathcal{D}}^k$)θ k, $ж^k$=min Reject$\mathcal{L}_G$ ($ё,ж;\mathcal{D}^k$)+ (1-Reject)$\mathcal{L}_G$ ($ё,ж;\tilde{\mathcal{D}}^k$), where γ is a hyperparameter to determine a ratio of the data collected at past time steps and the data collected at current time steps.

In an exemplary embodiment, the predictor 316 may output the predicted trajectories of each of the traffic agents that are located within the surrounding location of the ego agent 102. In particular, the predictor 316 may generate and construct a full-connected graph that represents the interaction mechanism between different agents. The graph may be denoted as $\mathcal{G}=\{\mathcal{V}, \varepsilon\}$, where $\mathcal{V}=\{v_i\}$ denotes the node attributes, and $\varepsilon=\{e_{ij}\}$ denotes the edge attributes. At the m-th message passing, the update rules are: $e_{ij}{}^m=f_e{}^m([v_i^{m-1}, v_j^{m-1}])$, $$\mu_i{}^m=f_v{}^m(\Phi[j\in N(v_i)](e_{ij}{}^m)), m=1,\ldots,n,$$

where $f_e$ and $f_v$ are the embedding functions for edges and nodes, respectively. The superscripts of $v_i{}^m$, $e_{ij}{}^m$, $f_v{}^m$, $f_e{}^m$ denote the m-th message passing. $\phi[j\in(v_i)](\cdot)$ aggregates the information of all the edges $e_{ij}$ between $v_i$ and its neighbors $N(v_i)$. An attention mechanism is used: Reject$_{ij}{}^m$=softmax $(e_{ij}{}^m)$, $v_i{}^m=\Gamma(\Sigma_{j\in N(v_i)}$Reject$_{ij}{}^m W v_j{}^{m-1})$.

The predicted trajectories may also be based on a Gaussian mixture model to represent the actions of each of the traffic agents at different time steps in a future horizon:

$$w_j=\text{soft max}(f_{w'}^j(v_i^n)),$$

$$\mu_j=f_\mu^j(v_i^n), \Sigma_j=f_\Sigma^j(v_i^n),$$

$$\{\dot{d}_{lon,0:t_f-1}, d_{lat,0:t_f-1}\}\sim \Sigma_j w_j \mathcal{N}(\mu_j, \Sigma_j)$$

where $w_j$, $\mu_j$, and $\Sigma_j$ denote the weight, mean, and variance of the j-th Gaussian function, respectively. Each Gaussian function represents the distribution of the future actions. After obtaining the action information, a first order integrator is used to provide the position in Frenét coordinates. The predicted trajectories of each the traffic agents are thereby output in Frenét coordinates and transformed to Cartesian coordinates. This procedure incorporates the road routing information directly. The loss $\mathcal{L} P(\psi, \mathcal{D})$ is the log-likelihood: $E_{(X,I)\sim D} \log P\Psi(X_{1:t_f}|X_{-t_h+1:0}, I)$, where $\psi$ is the parameter of the predictor.

In one or more configurations, the predicted trajectory associated with each of the traffic agents located within the surrounding location of the ego agent 102 are output to the interaction prediction module 132 in the form of Cartesian coordinates. The interaction prediction module 132 may be configured to analyze the Cartesian coordinates and output data associated with the predicted trajectories of each traffic agents that are located within the surrounding location to the agent control module 134 of the trajectory prediction application 106 at a plurality of time steps (t, t+1, t+2, t+n).

With continued reference to the method 400 of FIG. 4, upon predicting the trajectories of each of the traffic agents that are located within the surrounding location of the ego agent 102, the method 400 may proceed to block 408, wherein the method 400 may include controlling one or more systems of the ego agent 102 to operate the ego agent 102 based on the predicted trajectory of each of the traffic agents.

In an exemplary embodiment, upon receiving the outputted predicted trajectories of each of the traffic agents from the trajectory decoder 414, the interaction prediction module 132 may be configured to communicate trajectory data that pertains to the predicted trajectories of the traffic agents. In one configuration, the trajectory data may include geolocational coordinates that track the respective predicted trajectories of each of the traffic agents at a plurality of time steps (t, t+1, t+2, t+n).

In one embodiment, the agent control module 134 may be configured to analyze the trajectory data and the geolocation of the ego agent 102 within the surrounding environment of the ego agent 102. In one configuration, the agent control module 134 may be configured to output agent autonomous commands that may be associated with driving parameters to autonomously control the operation of the ego agent 102 to account for the predicted trajectories of the traffic agents.

In one embodiment, the agent control module 134 may be configured to communicate the autonomous control commands to the autonomous controller 120 of the ego agent 102. The autonomous controller 120 may thereby operably control the systems/control units 122 of the ego agent 102 to autonomously operate the ego agent 102 according to the autonomous control commands to providing one or more driving maneuvers to navigate the ego agent 102 within the surrounding environment. Accordingly, one or more functions of the ego agent 102 may be autonomously controlled to travel within the surrounding environment while avoiding any overlap at concurrent time steps with respect to the predicted trajectories of the traffic agents that are located within the surrounding location of the ego agent 102.

In particular, the ego agent 102 may be operably controlled to autonomously operate (e.g., with the application 106 of a particular speed, acceleration, steering angle, throttle angle, braking force, etc.) according to the autonomous control commands that adhere to dynamic constraints of the ego agent 102 to operate within the surrounding location without overlap with static obstacles and the predicted trajectories of the traffic agents while simultaneously optimizing speed and steering, and minimizing control effort associated with autonomous dynamic parameters of the ego agent 102.

In one configuration, the agent control module 134 may be configured to output alert output commands to the systems/control units 122 of the ego agent 102 to provide the operator 114 of the ego agent 102 with one or more warnings and/or alerts that may be associated with the predicted trajectories of the traffic agents that are located within the surrounding location.

Figure 5:
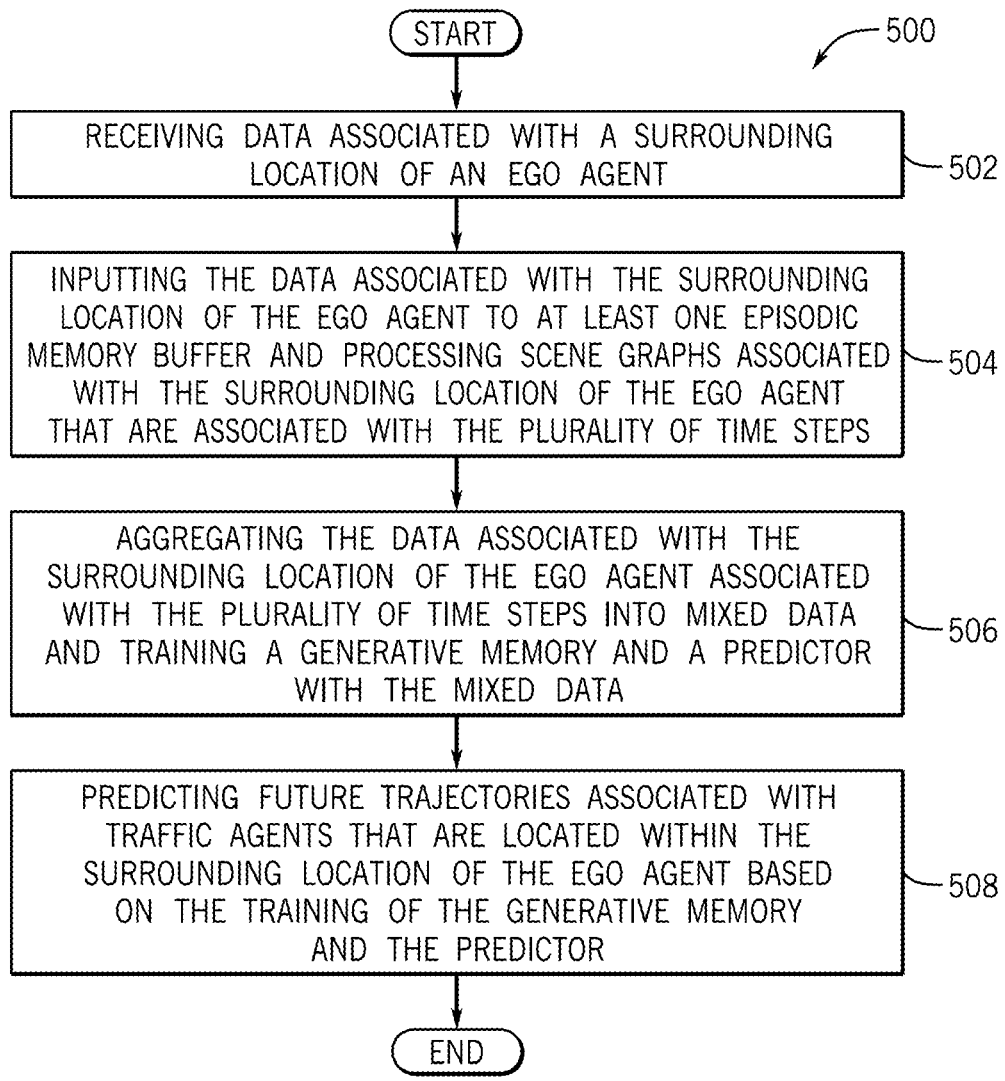
FIG. 5 is a process flow diagram of a method for completing continual multi-agent trajectory forecasting with a graph-based conditional generative memory system according to an exemplary embodiment of the present disclosure.

FIG. 5 is a process flow diagram of a method 500 for completing continual multi-agent trajectory prediction according to an exemplary embodiment of the present disclosure. FIG. 5 will be described with reference to the components of FIG. 1 and FIG. 3 though it is to be appreciated that the method 500 of FIG. 5 may be used with other systems/components. The method 500 may begin at block 502, wherein the method 500 may include receiving data associated with a surrounding location of an ego agent 102. In one embodiment, the data is associated with a plurality of time steps.

The method 500 may proceed to block 504, wherein the method 500 may include inputting the data associated with the surrounding location of the ego agent 102 to at least one episodic memory buffer and processing scene graphs associated with the surrounding location of the ego agent 102 that are associated with the plurality of time steps. The method may proceed to block 506, wherein the method 500 may include aggregating the data associated with the surrounding location of the ego agent associated with the plurality of time steps into mixed data and training a generative memory and a predictor with the mixed data. The method 500 may proceed to block 508, wherein the method 500 may include predicting future trajectories associated with traffic agents that are located within the surrounding location of the ego agent 102 based on the training of the generative memory and the predictor.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for completing continual multi-agent trajectory forecasting with a graph-based conditional generative memory system, comprising:

receiving data associated with traffic agents located within a surrounding location of an ego agent, wherein the data is associated with a plurality of time steps;

inputting the data associated with the surrounding location of the ego agent to at least one episodic memory buffer and processing scene graphs associated with the surrounding location of the ego agent that are associated with the plurality of time steps, wherein the at least one episodic memory buffer includes a past episodic memory buffer to store a portion of aggregated location data of the traffic agents associated with past time steps and a current episodic memory buffer to store a portion of aggregated location data of the traffic agents associated with a current time step, wherein the scene graphs include scene graphs associated with the traffic agents at a current time step based on data stored upon the current episodic memory buffer and scene graphs associated with the traffic agents at past time steps based on data stored upon the past episodic memory buffer, the scene graphs associated with past time steps including initial information with a current state of each traffic agent at a current time step, a past state of each traffic agent at one or more past time steps, and a future state of each traffic agent at one or more future time steps, wherein the scene graphs generate interactions between the traffic agents located within the surrounding location of the eco agent at respective past time steps and identify edge attributes denoting whether past trajectories of two of the traffic agents intersect due to one of the two traffic agents shifting to the other of the two traffic agents by traffic rules;

aggregating the data associated with the surrounding location of the ego agent associated with the plurality of time steps into mixed data and training a generative memory and a predictor with the mixed data; and predicting future trajectories associated with traffic agents that are located within the surrounding location of the ego agent based on the training of the generative memory and the predictor including a Gaussian mixture model representing actions of each traffic agent at different future time steps and, wherein the predictor generates and constructs a full-connected graph representing interactions between the traffic agents based on the predicted future trajectories.

2. The computer-implemented method of claim 1, wherein receiving data associated with the surrounding location of the ego agent includes receiving image data associated with RGB images that capture rich information about object appearance that pertain to roadway lane markings, roadway markers, and roadway infrastructure within locations of the ego agent at the plurality of time steps.

3. The computer-implemented method of claim 1, wherein receiving data associated with the surrounding location of the ego agent includes receiving LiDAR data that pertains to LiDAR coordinates that are associated with the locations, positions, depths, and dimensions of the traffic agents within locations of the ego agent at the plurality of time steps.

4. The computer-implemented method of claim 1, wherein inputting the data associated with the locations of the ego agent includes inputting aggregated location data associated with the surrounding location of the ego agent at a current time step and aggregated location data associated with the surrounding location of the ego agent at past time steps to a graph neural network infrastructure, wherein the graph neural network infrastructure includes the at least one episodic memory buffer, the generative memory, and the predictor.

5. The computer-implemented method of claim 4, wherein processing the scene graphs includes storing aggregated location data associated with the past time steps within the at least one episodic memory buffer and processing the scene graphs associated with trajectories of the traffic agents at the past time steps based on data stored upon the at least one episodic memory buffer.

6. The computer-implemented method of claim 5, wherein aggregating data associated with the surrounding location of the ego agent from a plurality of time steps includes mixing data from a current dataset associated with multi-agent trajectories of traffic agents located within the surrounding location of the ego agent at the current time step and multi-agent trajectories associated with traffic agents located within the surrounding location of the ego agent at the past time steps.

7. The computer-implemented method of claim 6, wherein training the generative memory and the predictor with the mixed data includes generating full multi-agent trajectories based on selectively stored partial information that is associated with the trajectories of each of the traffic agents at the past time steps and the trajectories of each of the traffic agents at the current time step.

8. The computer-implemented method of claim 6, wherein training the generative memory and the predictor with the mixed data includes computing a multi-modal probabilistic multi-agent trajectory distribution using an observation of all of the traffic agents during the plurality of time steps that have been and are located within the surrounding location of the ego agent.

9. The computer-implemented method of claim 1, wherein predicting the future trajectories associated with traffic agents that are located within the surrounding location of the ego agent include the predictor outputting the predicted trajectories of each of the traffic agents in Frenét coordinates and transforming the predicted trajectories in Cartesian coordinates to be evaluated to control at least one system of the ego agent to account for the predicted trajectories associated with traffic agents that are located within the surrounding location of the ego agent.

10. A system for completing continual multi-agent trajectory forecasting with a graph-based conditional generative memory system, comprising:
a memory storing instructions when executed by a processor cause the processor to:
receive data associated with traffic agents located within a surrounding location of an ego agent, wherein the data is associated with a plurality of time steps;
input the data associated with the surrounding location of the ego agent to at least one episodic memory buffer and process scene graphs associated with the surrounding location of the ego agent that are associated with the plurality of time steps,
wherein the at least one episodic memory buffer includes a past episodic memory buffer to store a portion of aggregated location data of the traffic agents associated with past time steps and a current episodic memory buffer to store a portion of aggregated location data of the traffic agents associated with a current time step,
wherein the scene graphs include scene graphs associated with the traffic agents at a current time step based on data stored upon the current episodic memory buffer and scene graphs associated with the traffic agents at past time steps based on data stored upon the past episodic memory buffer, the scene graphs associated with past time steps including initial information with a current state of each traffic agent at a current time step, a past state of each traffic agent at one or more past time steps, and a future state of each traffic agent at one or more future time steps,
wherein the scene graphs generate interactions between the traffic agents located within the surrounding location of the eco agent at respective past time steps and identify edge attributes denoting whether past trajectories of two of the traffic agents intersect due to one of the two traffic agents shifting to the other of the two traffic agents by traffic rules;
aggregate the data associated with the surrounding location of the ego agent associated with the plurality of time steps into mixed data and train a generative memory and a predictor with the mixed data; and
predict future trajectories associated with traffic agents that are located within the surrounding location of the ego agent based on the training of the generative memory and the predictor including a Gaussian mixture model representing actions of each traffic agent at different future time steps and, wherein the predictor generates and constructs a full-connected graph representing interactions between the traffic agents based on the predicted future trajectories.

11. The system of claim 10, wherein receiving data associated with the surrounding location of the ego agent includes receiving image data associated with RGB images that capture rich information about object appearance that pertain to roadway lane markings, roadway markers, and roadway infrastructure within locations of the ego agent at the plurality of time steps.

12. The system of claim 10, wherein receiving data associated with the surrounding location of the ego agent includes receiving LiDAR data that pertains to LiDAR coordinates that are associated with the locations, positions, depths, and dimensions of the traffic agents within locations of the ego agent at the plurality of time steps.

13. The system of claim 10, wherein inputting the data associated with the locations of the ego agent includes inputting aggregated location data associated with the surrounding location of the ego agent at a current time step and aggregated location data associated with the surrounding location of the ego agent at past time steps to a graph neural network infrastructure, wherein the graph neural network infrastructure includes the at least one episodic memory buffer, the generative memory, and the predictor.

14. The system of claim 13, wherein processing the scene graphs includes storing aggregated location data associated with the past time steps within the at least one episodic memory buffer and processing the scene graphs associated with trajectories of the traffic agents at the past time steps based on data stored upon the at least one episodic memory buffer.

15. The system of claim 14, wherein aggregating data associated with the surrounding location of the ego agent from a plurality of time steps includes mixing data from a current dataset associated with multi-agent trajectories of traffic agents located within the surrounding location of the ego agent at the current time step and multi-agent trajectories associated with traffic agents located within the surrounding location of the ego agent at the past time steps.

16. The system of claim 15, wherein training the generative memory and the predictor with the mixed data includes generating full multi-agent trajectories based on selectively stored partial information that is associated with the trajectories of each of the traffic agents at the past time steps and the trajectories of each of the traffic agents at the current time step.

17. The system of claim 15, wherein training the generative memory and the predictor with the mixed data includes computing a multi-modal probabilistic multi-agent trajectory distribution using an observation of all of the traffic agents during the plurality of time steps that have been and are located within the surrounding location of the ego agent.

18. The system of claim 10, wherein predicting the future trajectories associated with traffic agents that are located within the surrounding location of the ego agent include the predictor outputting the predicted trajectories of each of the traffic agents in Frenét coordinates and transforming the predicted trajectories in Cartesian coordinates to be evaluated to control at least one system of the ego agent to account for the predicted trajectories associated with traffic agents that are located within the surrounding location of the ego agent.

19. A non-transitory computer readable storage medium storing instruction that when executed by a computer, which includes a processor perform a method, the method comprising:

receiving data associated with traffic agents located within a surrounding location of an ego agent, wherein the data is associated with a plurality of time steps;

inputting the data associated with the surrounding location of the ego agent to at least one episodic memory buffer and processing scene graphs associated with the surrounding location of the ego agent that are associated with the plurality of time steps, wherein the at least one episodic memory buffer includes a past episodic memory buffer to store a portion of aggregated location data of the traffic agents associated with past time steps and a current episodic memory buffer to store a portion of aggregated location data of the traffic agents associated with a current time step, wherein the scene graphs include scene graphs associated with the traffic agents at a current time step based on data stored upon the current episodic memory buffer and scene graphs associated with the traffic agents at past time steps based on data stored upon the past episodic memory buffer, the scene graphs associated with past time steps including initial information with a current state of each traffic agent at a current time step, a past state of each traffic agent at one or more past time steps, and a future state of each traffic agent at one or more future time steps, wherein the scene graphs generate interactions between the traffic agents located within the surrounding location of the eco agent at respective past time steps and identify edge attributes denoting whether past trajectories of two of the traffic agents intersect due to one of the two traffic agents shifting to the other of the two traffic agents by traffic rules;

aggregating the data associated with the surrounding location of the ego agent associated with the plurality of time steps into mixed data and training a generative memory and a predictor with the mixed data; and predicting future trajectories associated with traffic agents that are located within the surrounding location of the ego agent based on the training of the generative memory and the predictor including a Gaussian mixture model representing actions of each traffic agent at different future time steps and, wherein the predictor generates and constructs a full-connected graph representing interactions between the traffic agents based on the predicted future trajectories.

20. The non-transitory computer readable storage medium of claim 19, wherein predicting the future trajectories associated with traffic agents that are located within the surrounding location of the ego agent include the predictor outputting the predicted trajectories of each of the traffic agents in Frenét coordinates and transforming the predicted trajectories in Cartesian coordinates to be evaluated to control at least one system of the ego agent to account for the predicted trajectories associated with traffic agents that are located within the surrounding location of the ego agent.

* * * * *